(12) United States Patent
Chung

(10) Patent No.: US 8,453,150 B2
(45) Date of Patent: May 28, 2013

(54) MULTITHREAD APPLICATION-AWARE MEMORY SCHEDULING SCHEME FOR MULTI-CORE PROCESSORS

(75) Inventor: Jaewoong Chung, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 384 days.

(21) Appl. No.: 12/795,871

(22) Filed: Jun. 8, 2010

(65) Prior Publication Data

US 2011/0302586 A1    Dec. 8, 2011

(51) Int. Cl.
*G06F 9/50* (2006.01)
*G06F 13/00* (2006.01)

(52) U.S. Cl.
USPC ........... 718/102; 718/103; 718/104; 711/100; 711/147

(58) Field of Classification Search
None
See application file for complete search history.

(56) References Cited

U.S. PATENT DOCUMENTS

| | | | |
|---|---|---|---|
| 8,180,975 B2 * | 5/2012 | Moscibroda et al. | 711/151 |
| 2007/0079079 A1 | 4/2007 | Li et al. | |
| 2009/0216962 A1 * | 8/2009 | Mutlu et al. | 711/151 |

FOREIGN PATENT DOCUMENTS

| WO | WO 2007/128168 | 11/2007 |
|---|---|---|
| WO | WO 2009/020970 | 2/2009 |

OTHER PUBLICATIONS

Notification of Transmittal of the International Search Report and the Written Opinion of the International Searching Authority, or the Declaration corresponding to PCT/US2011/038526, mailed Sep. 2, 2011, 8 pages.
Mutlu, Onur et al., "Parallelism-Aware Batch Scheduling: Enhancing both Performance and Fairness of Shared DRAM Systems" in *ISCA-36*, 2008, 12 pages.
Buchanan, Matt et al., "Coordinated Thread Scheduling for Workstation Clusters Under Windows NT" in USENIX Windows NT Workshop, 1997, 7 pages.
Rixner, Scott et al., "Memory Access Scheduling" in *ISCA-27*, 2000, 11 pages.

\* cited by examiner

*Primary Examiner* — Qing Wu
(74) *Attorney, Agent, or Firm* — Harrity & Harrity, LLP

(57) ABSTRACT

A device may include a memory controller that identifies a multithread application, and adjusts a memory scheduling scheme for the multithread application based on the identification of the multithread application.

24 Claims, 15 Drawing Sheets

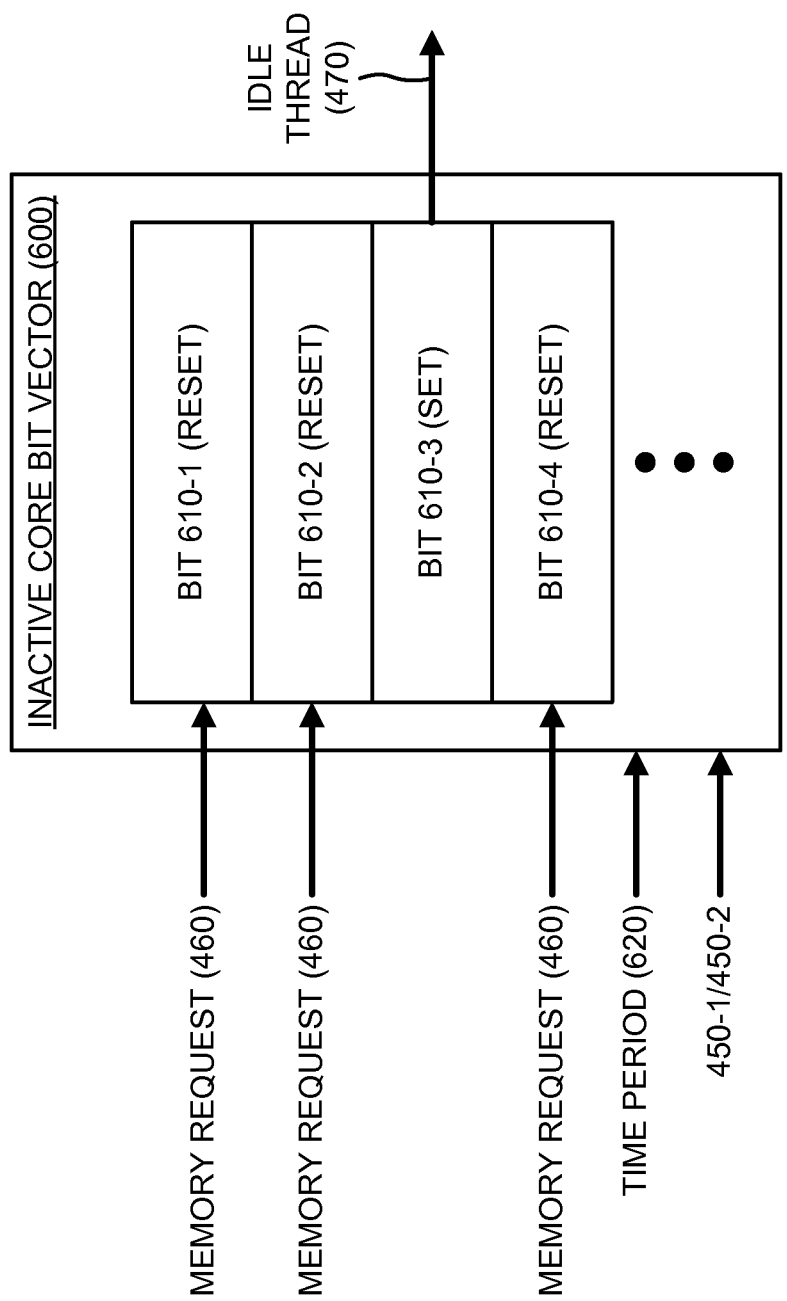

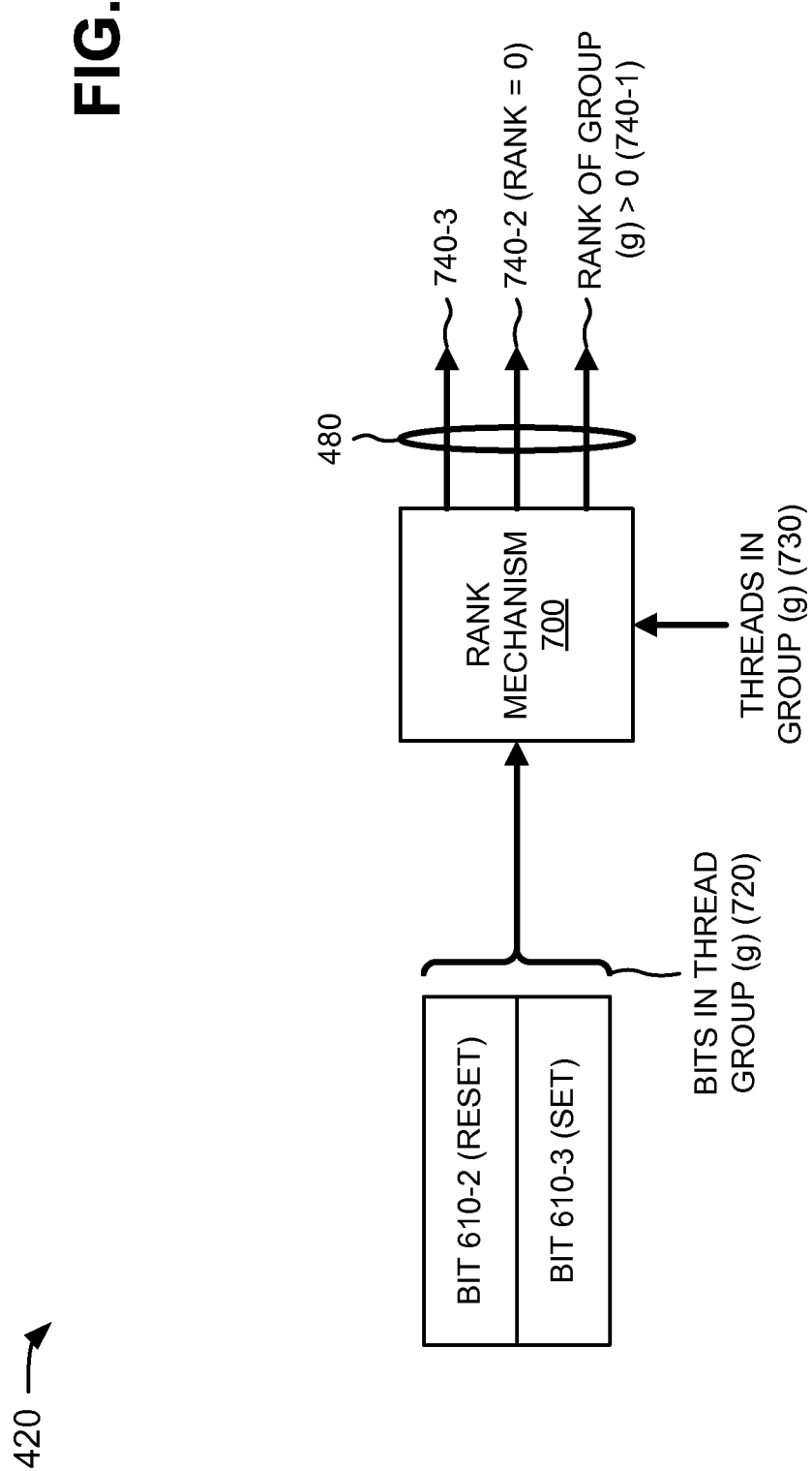

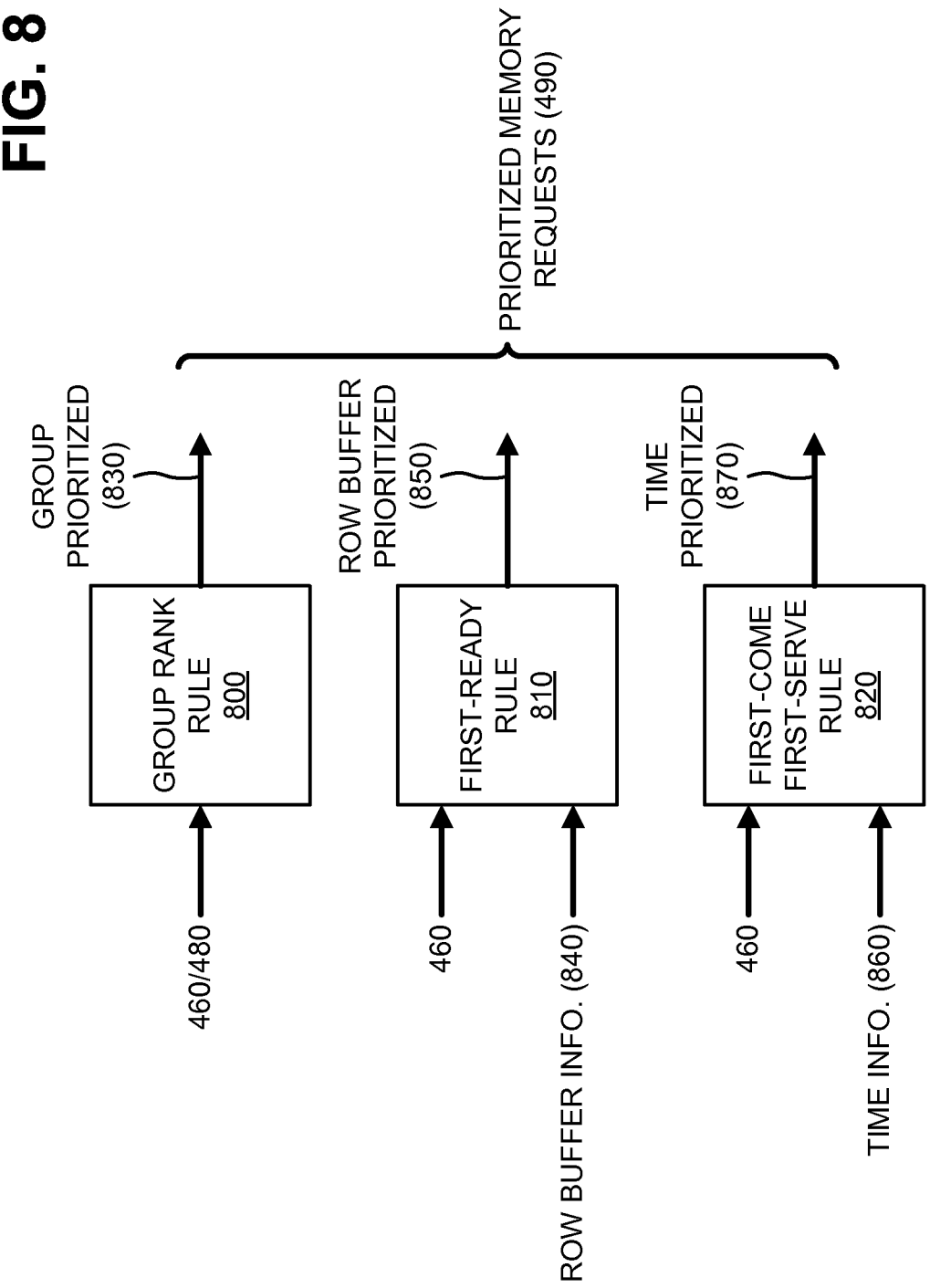

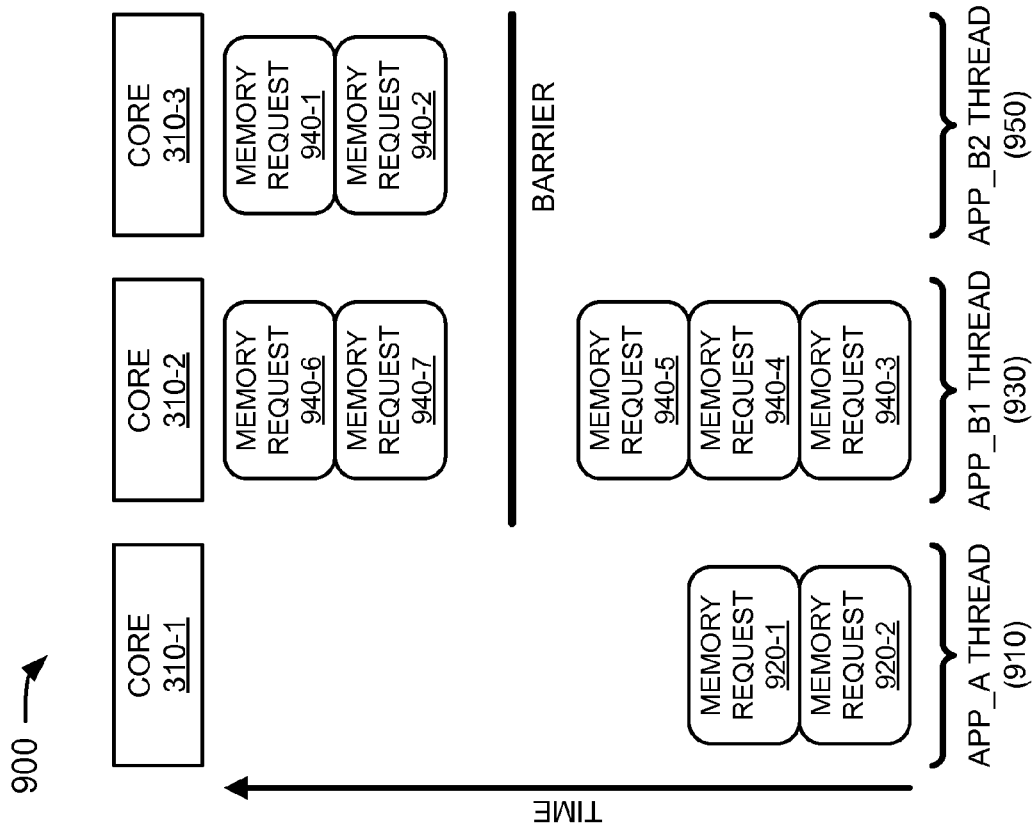
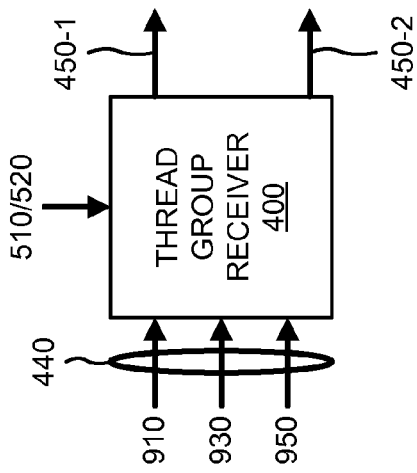

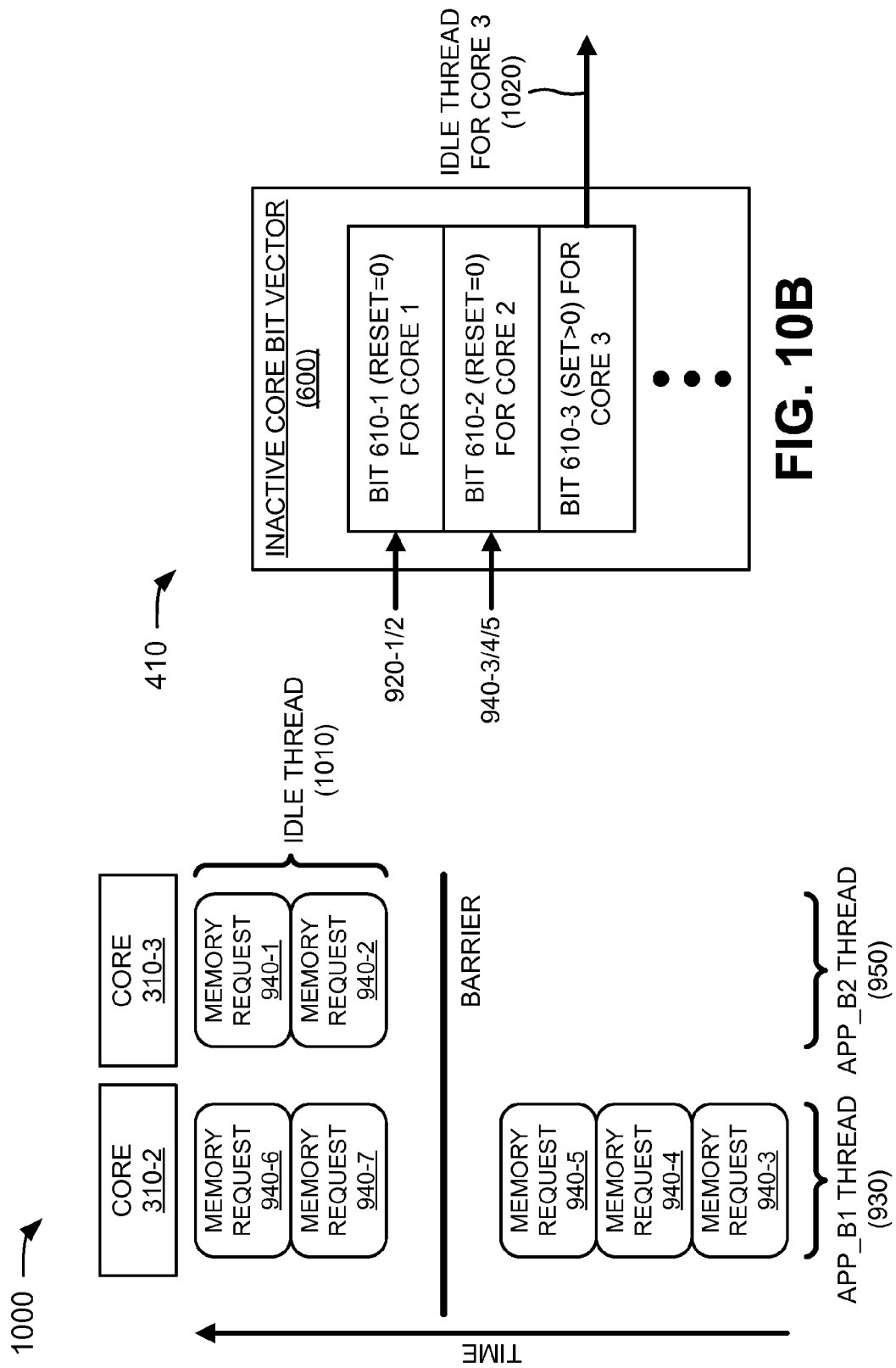

MULTITHREAD APPLICATION-AWARE MEMORY SCHEDULING SCHEME FOR MULTI-CORE PROCESSORS

BACKGROUND

The shift to multiple/many-core (multi-core) processors has made multithread applications prevalent in both client and server platforms. High thread-level parallelism (TLP) of such applications efficiently takes advantage of the hardware parallelism supported by the multi-core processors (e.g., chip multi-processor (CMP) systems). There are software and hardware proposals to expedite execution of multithread applications, such as coordinated thread scheduling of an operating system that executes threads of an application together. However, none of the proposals addresses performance problems in memory scheduling (e.g., by a memory controller) for multithread applications, which can cause significant performance degradation.

Some mechanisms, such as a first-ready first-come-first-serve (FRFCFS) mechanism and a parallelism aware batch scheduling (PAR-BS) mechanism, attempt to improve memory controller performance. For example, the FRFCFS mechanism improves memory controller performance by scheduling memory requests accessing row buffers of a memory bank. The PAR-BS mechanism batches memory requests, executes the memory requests on a batch-by-batch basis, and improves memory controller performance by applying shortest-job-first (SJF) scheduling to each batch. However, both mechanisms only optimize memory scheduling for single-thread applications, and fail to optimize memory scheduling for multithread applications.

SUMMARY OF EMBODIMENTS OF THE INVENTION

According to one embodiment, a computing device-implemented method may include identifying, by the computing device, a multithread application, and adjusting, by the computing device, a memory scheduling scheme for the multithread application based on the identification of the multithread application.

According to one aspect, the multithread application may be associated with a first group; identifying a multithread application may include receiving threads of the multithread application associated with the first group; and the method may further include receiving a thread of a single-thread application associated with a second group.

According to another aspect, the adjusting a memory scheduling scheme may include determining a number of idle threads in the first group and the second group, ranking the first group based on the determined number of idle threads in the first group, ranking the second group based on the determined number idle threads in the second group, and prioritizing a memory request, associated with one of the first group or the second group, whichever is ranked higher, over a memory request associated with one of the first group or the second group, whichever is ranked lower.

According to another embodiment, a memory controller of a device may include processing logic to receive threads of a multithread application associated with a group, and receive a thread of a single-thread application associated with another group. The processing logic may also determine a number of idle threads in the group and the other group, rank the group based on the determined number of idle threads in the group, and rank the other group based on the determined number idle threads in the other group. The processing logic may further prioritize a memory request, associated with one of the group or the other group, whichever is ranked higher, over a memory request associated with one of the group or the other group, whichever is ranked lower.

According to still another embodiment, a device may include a memory controller to identify a multithread application, and adjust a memory scheduling scheme for the multithread application based on the identification of the multithread application.

According to a further embodiment, a computer-readable memory device may store one or more computer-executable instructions, and may include one or more instructions to identify a multithread application from a group of other applications, and one or more instructions to adjust a memory scheduling scheme for the multithread application based on the identification of the multithread application.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 6 is a diagram of an example functional component of an idle thread detector of the memory controller depicted in FIG. 4;

FIG. 7 is a diagram of an example functional component of a group ranker of the memory controller depicted in FIG. 4;

FIG. 8 is a diagram of example functional components of a memory scheduler of the memory controller depicted in FIG. 4;

FIGS. 9A and 9B are diagrams of example operations capable of being performed by the thread group receiver depicted in FIG. 5;

FIGS. 10A and 10B are diagrams of example operations capable of being performed by the idle thread detector depicted in FIG. 6;

DETAILED DESCRIPTION

The following detailed description refers to the accompanying drawings. The same reference numbers in different drawings may identify the same or similar elements. Also, the following detailed description does not limit the invention.

Overview

Systems and/or methods described herein may enable a memory controller of a device (e.g., a device with multi-core processors, such as a personal computer, a laptop computer, a tablet computer, a server device, a handheld or mobile device, and/or other types computation or communication devices) to identify one or more multithread applications, and to adjust or optimize a memory scheduling scheme for the multithread application(s) based on the identification of the multithread application(s). Such systems and/or methods may prevent performance degradation (e.g., in the device) due to inefficient memory scheduling. In one embodiment, the memory controller may receive threads of a multithread application associated with a first group, and may receive a thread of a single-thread application associated with a second group. The memory controller may determine a number of idle threads in the first and second groups, may rank the first and second groups based on the number of idle threads, and may prioritize a memory request, from a group with a higher rank, over a memory request from a group with a lower rank.

The term "thread," as used herein, is intended to be broadly interpreted to include a portion (e.g., a task) of a computer program (or application) that permits the application to execute sequential actions or many actions at once. Each thread in an application may identify a process that executes when instructed by the application.

The terms "component" and "device," as used herein, are intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Example Memory Scheduling Arrangement

Figure 1:
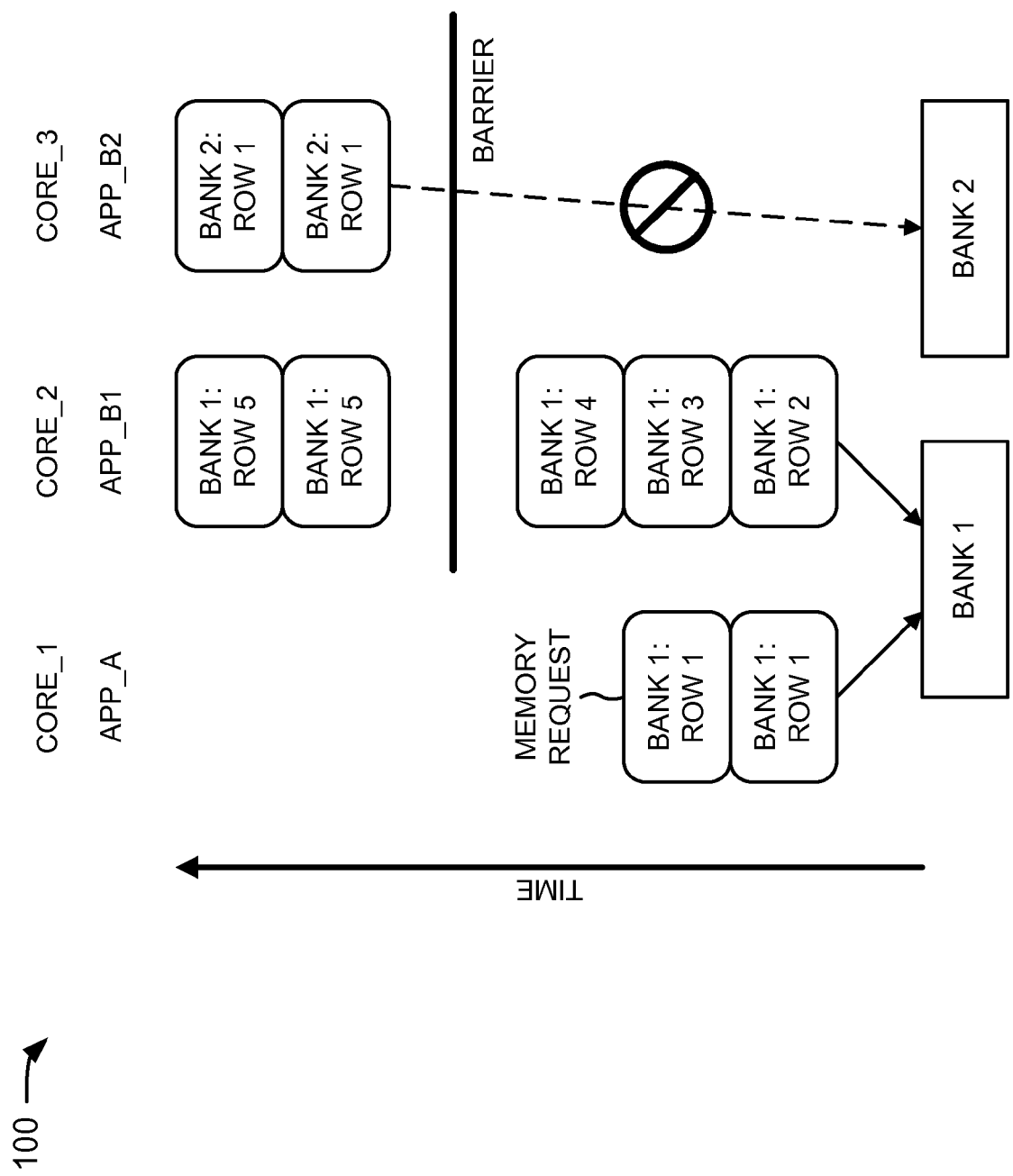
FIG. 1 is a diagram of an example memory scheduling arrangement that experiences performance degradation.

FIG. 1 is a diagram of an example memory scheduling arrangement 100 that experiences performance degradation. As shown, a single-thread application (e.g., APP_A) may include two memory requests associated with a first memory bank (e.g., BANK 1) and a first core (e.g., CORE_1) of a multi-core processor. A multithread application (e.g., APP_B) may include two threads (e.g., thread APP_B1 and thread APP_B2) and a barrier for synchronization. In one example, the barrier for synchronization may instruct the multi-core processor to enforce an ordering constraint on memory requests provided before and after the barrier. Thread APP_B1 may be associated with a second core (e.g., CORE_2) of the multi-core processor, may include two memory requests provided after the barrier, and may include three memory requests provided before the barrier and associated with first memory bank BANK 1. Thread APP_B2 may be associated with a third core (e.g., CORE_3) of the multi-core processor, and may include two memory requests provided after the barrier.

Multithread application APP_B may be designed to take advantage of bank-level parallelism by having thread APP_B1 access first memory bank BANK 1 and thread APP_B2 access second memory bank BANK 2. Thread APP_B2 may reach the barrier ahead of thread APP_B1 due to a possible load imbalance around the barrier (e.g., which may occur since making a perfect runtime load balance may be difficult). The load imbalance may prevent the memory requests associated with thread APP_B2 from accessing second memory bank BANK 2, which may cause third core CORE_3 to be in an idle state. Third core CORE_3 may remain in the idle state until the three memory requests (e.g., provided below the barrier) associated with thread APP_B1 are handled. Thus, the three memory requests (e.g., provided below the barrier) associated with thread APP_B1 should be given priority over the memory requests associated with single-thread application APP_A (e.g., so that third core CORE_3 remains idle for three cycles).

However, current memory scheduling schemes are unaware of multithread applications and attempt to schedule memory requests to accelerate threads of a multithread application that semantically prevent other threads of the same multithread application from making progress. For example, thread APP_B1 may prevent thread APP_B2 from making progress due to the barrier. If the FRFCFS memory scheduling scheme is used in arrangement 100, the FRFCFS scheme may cause performance degradation due to single-thread application APP_A having a higher row buffer hit ratio than thread APP_B1. In the FRFCFS scheme, a memory request that hits a row buffer may be prioritized. As a result, single-thread application APP_A's memory requests may be prioritized over thread APP_B1's memory requests since single-thread application APP_A's memory requests are associated with the same row (e.g., ROW 1) of first memory bank BANK 1 and thread APP_B1's memory requests are associated with different rows (e.g., ROWS 2-4) of first memory bank BANK 1. This may increase the idle time of third core CORE_3 from three cycles to five cycles and may prevent third core CORE_3 from executing multithread application APP_B behind the barrier.

If the PAR-BS memory scheduling scheme is used in arrangement 100, the PAR-BS scheme may prioritize memory requests of a thread that has a smallest number of memory requests in a memory request queue according to a shortest-job-first (SJF) policy. As a result, single-thread application APP_A's memory requests may be prioritized over thread APP_B1's memory requests since the number of single-thread application APP_A's memory requests is two while the number of thread APP_B1's memory requests is three. This may increase the idle time of third core CORE_3 from three cycles to five cycles and may prevent third core CORE_3 from executing multithread application APP_B behind the barrier. The FRFCFS and PAR-BS memory scheduling schemes, as well as other memory scheduling schemes, are unaware of multithread applications, cause performance degradation, and render useless an operating system's efforts for coordinated thread scheduling.

In contrast, systems and/or methods described herein may enable a memory controller of a device to recognize one or more multithread applications, and to optimize a memory scheduling scheme for the multithread application(s) based on the recognition of the multithread application(s). For example, systems and/or methods described herein may prioritize a memory request that can benefit a group of threads (e.g., serving thread APP_B1's requests to benefit both thread APP_B1 and thread APP_B2), rather than just a single thread.

Example Device Configuration

Figure 2:
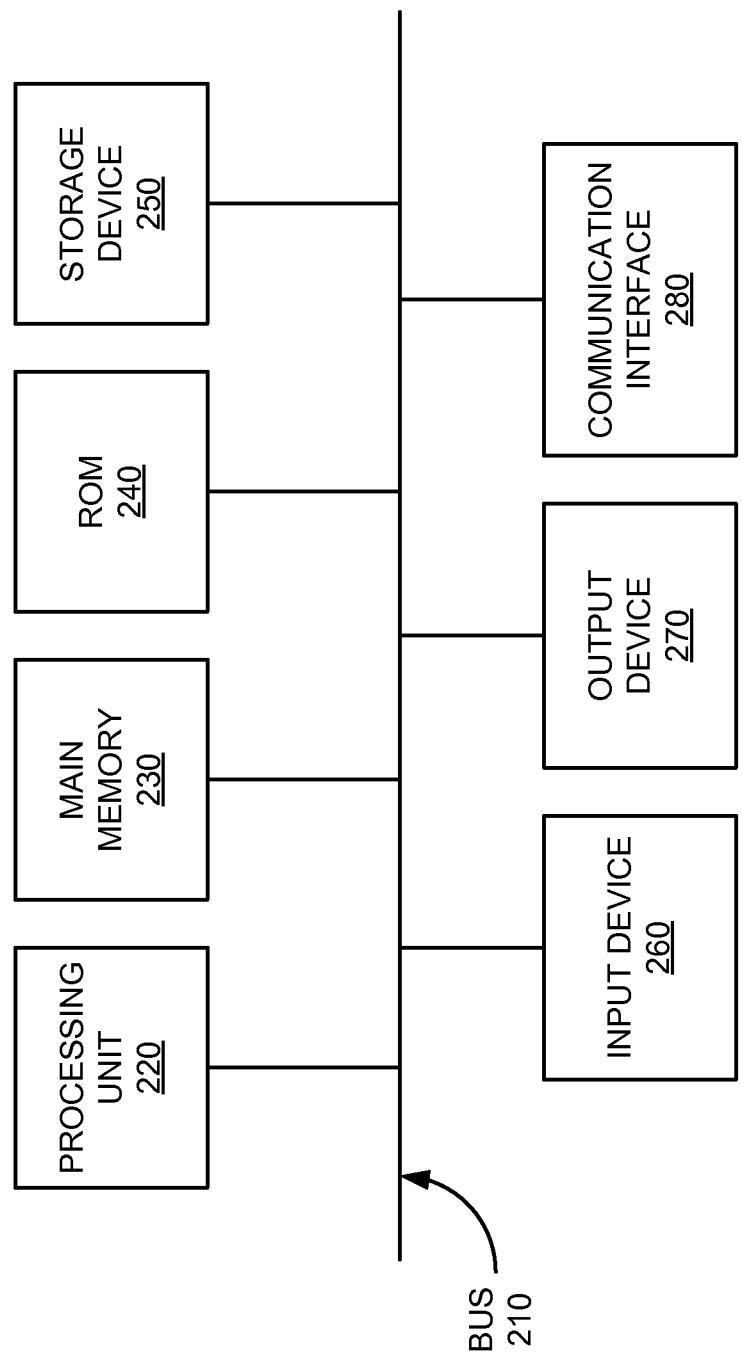
FIG. 2 is a diagram of example components of a device that may execute a multithread application-aware memory scheduling scheme according to embodiments described herein.

FIG. 2 is a diagram of example components of a device 200 that may execute a multithread application-aware memory scheduling scheme according to embodiments described herein. Device 200 may include any computation or communication device that utilizes multi-core processors and/or multithread applications. For example, device 200 may include a personal computer, a desktop computer, a laptop computer, a tablet computer, a server device, a radiotelephone, a personal communications system (PCS) terminal, a personal digital assistant (PDA), a cellular telephone, a smart phone, and/or other types computation or communication devices.

As illustrated in FIG. 2, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors (e.g., multi-core processors), microprocessors, or other types of processing units that may interpret and execute instructions.

In one embodiment, processing unit 220 may include a single processor that includes multiple cores. Main memory 230 may include a RAM, a dynamic RAM (DRAM), and/or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, embodiments described herein are not limited to any specific combination of hardware circuitry and software.

Although FIG. 2 shows example components of device 200, in other embodiments, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
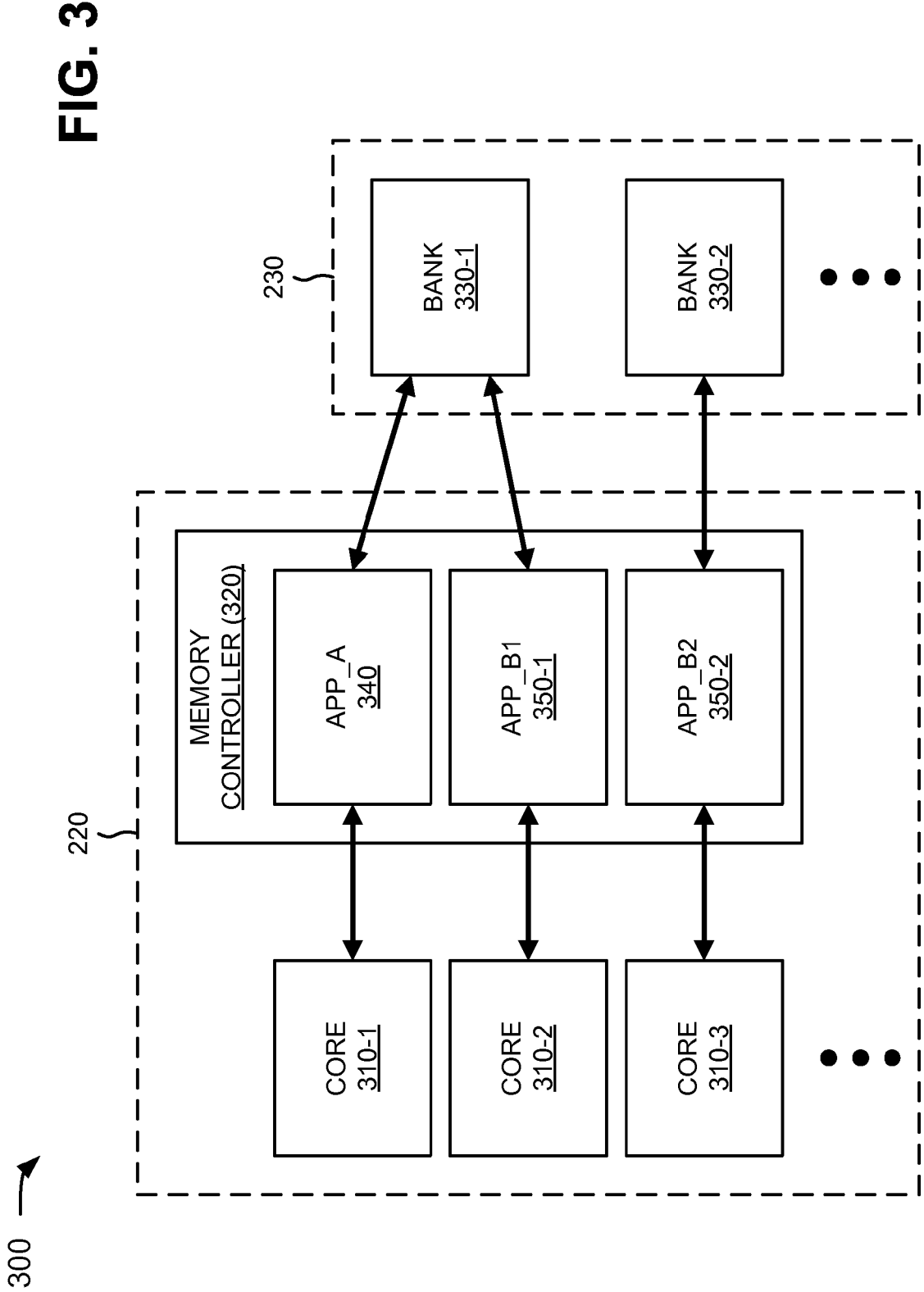
FIG. 3 is a diagram of example components of a processing unit and a main memory of the device depicted in FIG. 2.

FIG. 3 is a diagram of example components of processing unit 220 and main memory 230 of device 200. In one embodiment, the components depicted in FIG. 3 may form a memory scheduling arrangement 300. As shown, processing unit 220 may include multiple cores 310-1, 310-2, 310-3, etc. (collectively referred to herein as "cores 310") and a memory controller 320. Main memory 230 may include multiple memory banks 330-1, 330-2, etc. (collectively referred to herein as "memory banks 330").

Cores 310 may be integrated onto a single integrated circuit die (e.g., a chip multiprocessor (CMP)) or may be integrated onto multiple dies in a single chip package. Each of cores 310 may include a processor, a microprocessor, or another type of processing unit that may interpret and execute instructions.

Memory controller 320 may include one or more processors, microprocessors, ASICs, FPGAs, or other types of processing logic that may interpret and execute instructions (e.g., contained in a computer-readable medium of memory controller 320) in order to perform operations described herein. In one embodiment, memory controller 320 may include a digital circuit that manages flow of data going to and from main memory 230. Memory controller 320 may be a separate chip or may be integrated into another chip, such as on a die of processing unit 220. Memory controller 320 may include logic to read from and write to main memory 230, and to refresh main memory 230 by sending current through main memory 230. Reading and writing from/to main memory 230 may be facilitated by use of multiplexers and demultiplexers. Memory controller 320 may select a correct row and column address of main memory 230 as inputs to the multiplexer. The demultiplexer may select the correct memory location of main memory 230, and may return data associated with the memory location. In another embodiment, memory controller 320 may be a functional component of processing unit 220.

Each of memory banks 330 may include an individual section of data stored in main memory 230. In one example, each of memory banks 330 may contain data that is stored temporarily and is used as a memory cache. Memory banks 330 may be ordered consecutively, which may provide easy access to individual items stored in main memory 230. Each of memory banks 330 may include a physical section of main memory 230 that may be designed to handle information transfers independently.

As further shown in FIG. 3, memory controller 320 may provide a memory scheduling scheme for a single-thread application (APP_A) 340 and a multithread application (APP_B) 350 that includes two threads (e.g., thread (APP_B1) 350-1 and thread (APP_B2) 350-2). Single-thread application 340 may be executed by core 310-1 and may be associated with memory bank 330-1. Thread 350-1 may be executed by core 310-2 and may be associated with memory bank 330-1. Thread 350-2 may be executed by core 310-3 and may be associated with memory bank 330-2. Thus, memory scheduling arrangement 300 depicted in FIG. 3 may be similar to memory scheduling arrangement 100 depicted FIG. 1.

However, unlike the conventional memory scheduling schemes (e.g., described above in connection with FIG. 1), memory controller 320 may provide a cost-effective memory scheduling scheme that prioritizes threads (e.g., threads 350-1 and 350-2) of a multithread application (e.g., multithread application 350) if the multithread application includes idle threads. For explanatory purposes, assume that multithread application 350 includes idle threads (e.g., thread 350-2 may be idle). A thread may be idle for several reasons. For example, as described above in connection with FIG. 1, a load imbalance at a barrier may render idle threads that reach the barrier at an earlier time. In another example, a critical section protected by a lock may permit only one thread of a multithread application to enter, while other threads (e.g., of the multithread application) waiting to enter the critical section become idle. In still another example, algorithmically sequential regions of a multithread application may be executed by a single thread of the multithread application, which may render idle other threads of the multithread application. By prioritizing threads of a multithread application with idle threads, memory controller 320 may help the idle threads quickly finish an inefficient execution phase and return the multithread application to an execution phase where all threads are completely executed in parallel.

In an embodiment, memory controller 320 may receive threads 350-1 and 350-2 of multithread application 350 (e.g., associated with a first group by an operating system), and may receive a thread of single-thread application 340 (e.g., associated with a second group by an operating system). Memory controller 320 may determine a number of idle threads (e.g., thread 350-2) in the first and second groups, and may rank the first and second groups based on the number of idle threads. For example, since the first group may include an idle thread (e.g., thread 350-2) and the second group may not include an idle thread, memory controller 320 may rank the first group higher than the second group. Memory controller 320 may prioritize a memory request, from a group with a higher rank, over a memory request from a group with a lower rank. For example, memory controller 320 may prioritize a memory request from the first group (e.g., from thread 350-2) over a memory request from the second group (e.g., from single-thread application 340).

Although FIG. 3 shows example components of processing unit 220 and main memory 230, in other embodiments, processing unit 220 and/or main memory 230 may include fewer components, different components, differently arranged components, or additional components than depicted in FIG. 3. Alternatively, or additionally, one or more components of processing unit 220 and/or main memory 230 may perform one or more other tasks described as being performed by one or more other components of processing unit 220 and/or main memory 230.

Example Memory Controller Configuration

Figure 4:
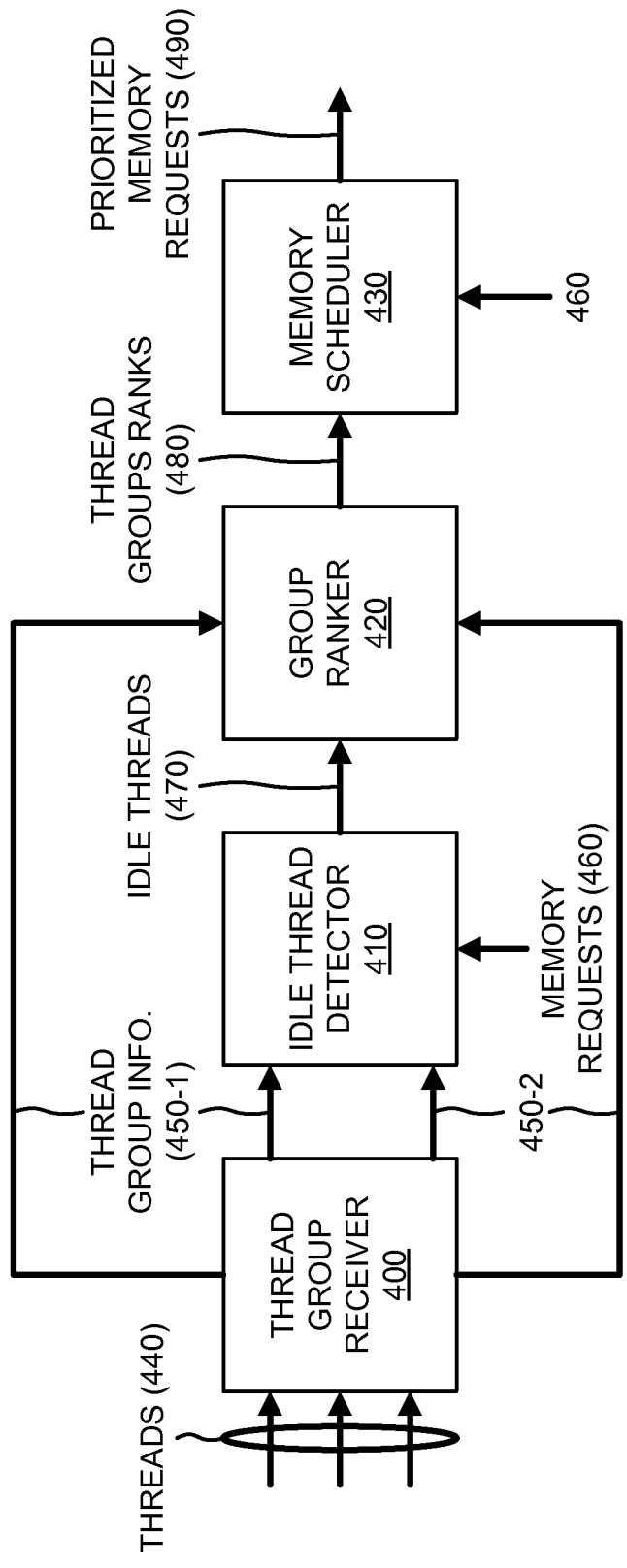
FIG. 4 is a diagram of example functional components of a memory controller of the processing unit depicted in FIG. 3.

FIG. 4 is a diagram of example functional components of memory controller 320. In one embodiment, the functional components described in connection with FIG. 4 may be implemented by the one or more processors, microprocessors, ASICs, FPGAs, or other types of processing logic included in memory controller 320. As shown in FIG. 4, memory controller 320 may include a thread group receiver 400, an idle thread detector 410, a group ranker 420, and a memory scheduler 430.

Thread group receiver 400 may include hardware or a combination of hardware and software that may receive one or more threads 440 associated with one or more applications, and may generate thread group information 450-1 (e.g., for a first thread group defined by an operating system of device 200) and thread group information 450-2 (e.g., for a second thread group defined by an operating system of device 200) for threads 440. For example, thread group receiver 400 may generate thread group information 450-1 for a thread of a single-thread application and may generate thread group information 450-2 for threads of a multithread application. As shown in FIG. 4, thread group receiver 400 may provide thread group information 450-1 (e.g., for a first defined thread group) and thread group information 450-2 (e.g., for a second defined thread group) to idle thread detector 410 and group ranker 420. Further details of thread group receiver 400 are provided below in connection with, for example, FIG. 5.

Idle thread detector 410 may include hardware or a combination of hardware and software that may receive thread group information 450-1 and 450-2 from thread group receiver 400, and may receive one or more memory requests 460 associated with threads 440. Idle thread detector 410 may determine which of threads 440 are idle based on thread group information 450-1/450-2 and memory requests 460, and may provide the determined idle threads to group ranker 420, as indicated by reference number 470. Further details of idle thread detector 410 are provided below in connection with, for example, FIG. 6.

Group ranker 420 may include hardware or a combination of hardware and software that may receive thread group information 450-1 and 450-2 from thread group receiver 400, and may receive idle threads 470 from idle thread detector 410. Group ranker 420 may rank threads in the thread groups (e.g., defined by thread group information 450-1 and 450-2) based on a number of idle threads 470 in each of the thread groups. Group ranker 420 may provide ranks of the thread groups to memory scheduler 430, as indicated by reference number 480. Further details of group ranker 420 are provided below in connection with, for example, FIG. 7.

Memory scheduler 430 may include hardware or a combination of hardware and software that may receive thread groups ranks 480 from group ranker 420, and may receive one or more memory requests 460 associated with threads 440. Memory scheduler 430 may prioritize memory requests 460 based on thread groups ranks 480, as indicated by reference number 490, and may implement prioritized memory requests 490 in device 200. Further details of memory scheduler 430 are provided below in connection with, for example, FIG. 8.

Although FIG. 4 shows example functional components of memory controller 320, in other embodiments, memory controller 320 may include fewer functional components, different functional components, differently arranged functional components, or additional functional components than depicted in FIG. 4. Alternatively, or additionally, one or more functional components of memory controller 320 may perform one or more other tasks described as being performed by one or more other functional components of memory controller 320.

Figure 5:
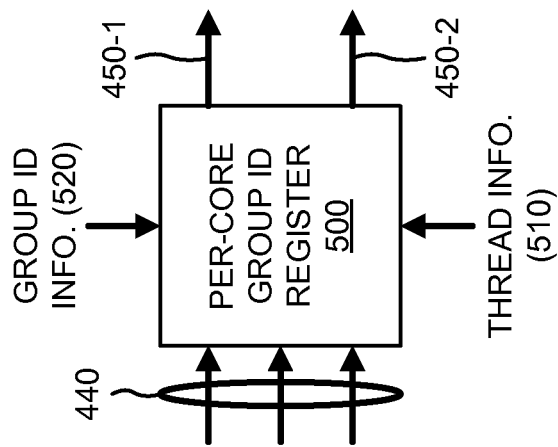
FIG. 5 is a diagram of example functional components of a thread group receiver of the memory controller depicted in FIG. 4.

FIG. 5 is a diagram of example functional components of thread group receiver 400 of memory controller 320. In one embodiment, the functional components described in connection with FIG. 5 may be implemented by the one or more processors, microprocessors, ASICs, FPGAs, or other types of processing logic included in memory controller 320. As shown in FIG. 5, thread group receiver 400 may include a per-core group identification (ID) register 500.

Per-core group ID register 500 may include hardware or a combination of hardware and software that may receive thread information 510 and group ID information 520 from, for example, an operating system of device 200. In one example, the operating system may generate thread information 510 (e.g., for coordinated thread scheduling) when executing threads of the same application together. Group ID information 520 may include group IDs of threads being executed on each core (e.g., each of cores 310). When the operating system schedules a particular thread on a core (e.g., one of cores 310), the operating system may update per-core group ID register 500 with a group ID of the particular thread (e.g., group ID information 520).

In one example embodiment, a main thread of a multithread application may be executed by the operating system as if the main thread is a single-thread application. The operating system may assign a group identification (ID) to the main thread. When the main thread spawns more threads, the operating system may assign the group ID (e.g., group ID information 520) to the spawned threads. When one of the threads of the multithread application is scheduled to execute on a particular core (e.g., one of cores 310), per-core group ID register 500 may set the thread to be executed to the group ID. As further shown in FIG. 5, per-core group ID register 500 may generate thread group information 450-1 and thread group information 450-2 based on thread information 510 and group ID information 520.

Although FIG. 5 shows example functional components of thread group receiver 400, in other embodiments, thread group receiver 400 may include fewer functional components, different functional components, differently arranged functional components, or additional functional components than depicted in FIG. 5. Alternatively, or additionally, one or more functional components of thread group receiver 400 may perform one or more other tasks described as being performed by one or more other functional components of thread group receiver 400.

FIG. 6 is a diagram of an example functional component of idle thread detector 410 of memory controller 320. In one embodiment, the functional component described in connection with FIG. 6 may be implemented by the one or more processors, microprocessors, ASICs, FPGAs, or other types of processing logic included in memory controller 320. As shown in FIG. 6, idle thread detector 410 may include an inactive core bit vector 600 that may include one or more bits 610-1, . . . 610-4 (collectively referred to herein as "bits 610").

Inactive core bit vector 600 may include hardware or a combination of hardware and software that may receive thread group information 450-1 and 450-2 from thread group receiver 400, may receive memory requests 460, and may receive a time period 620. Inactive core bit vector 600 may associate each of bits 610 to one of threads 440 and its corresponding core (e.g., one of cores 310) based on thread group information 450-1 and 450-2. For example, inactive core bit vector 600 may associate bit 610-1 with a thread of a single-thread application, may associate bit 610-2 with a first thread of a multithread application, and may associate bit 610-3 with a second thread of the multithread application. Inactive core bit vector 600 may periodically set (e.g., to a particular value) each of bits 610 at a beginning of time period 620. Time period 620 may be a variable parameter and may be set based on the type of device 200 utilizing memory controller 320 and/or the types of applications being executed by device 200. In one example, time period 620 may be short enough to quickly adapt to application phase changes, but may be long enough to prevent misjudging that a core (e.g., one of cores 310) is idle when it is not. In one embodiment, time period 620 may be set to a value of about one-thousand (1,000) clock cycles.

Inactive core bit vector 600 may reset one of bits 610 when there is a memory request (e.g., memory request 460) from a thread (e.g., as defined by thread group information 450-1 and 450-2) executing on a corresponding core. For example, as shown in FIG. 6, bits 610-1, 610-2, and 610-4 may be associated with memory requests 460 from threads executing on a corresponding core. Thus, inactive core bit vector 600 may reset bits 610-1, 610-2, and 610-4. Since bit 610-3 is not associated with a memory request, inactive core bit vector 600 may not reset bit 610-3. If a bit (e.g., bit 610-3) remains set at the end of time period 620, inactive core bit vector 600 may determine that a thread executing on the core corresponding to bit 610-3 is idle during time period 620, as indicated by reference number 470. Inactive bit core vector 600 may output indication 470 of the idle thread.

Although FIG. 6 shows an example functional component of idle thread detector 410, in other embodiments, idle thread detector 410 may include different functional components, differently arranged functional components, or additional functional components than depicted in FIG. 6.

FIG. 7 is a diagram of an example functional component of group ranker 420 of memory controller 320. In one embodiment, the functional component described in connection with FIG. 7 may be implemented by the one or more processors, microprocessors, ASICs, FPGAs, or other types of processing logic included in memory controller 320. As shown in FIG. 7, group ranker 420 may include a rank mechanism 700.

Rank mechanism 700 may include hardware or a combination of hardware and software that may receive thread group information 450-1 and 450-2 (not shown) from thread group receiver 400, and may receive an indication 470 (not shown) of idle threads from idle thread detector 410. Rank mechanism 700 may receive bits 610 in one or more thread groups (e.g., as defined by thread group information 450-1 and 450-2) and threads (e.g., as defined by thread group information 450-1 and 450-2) associated with the one or more thread groups. For example, as shown in FIG. 7, rank mechanism 700 may receive (e.g., at the end of time period 620) bits 610-2 and 610-3 in a thread group (g) 720 and may receive threads 730 associated with thread group (g) 720. Rank mechanism 700 may determine a rank 740-1 of thread group (g) 720 based on bits 610-2 and 610-3 in thread group (g) 720. In one embodiment, rank mechanism 700 may determine rank 740-1 of thread group (g) 720 by adding values of bits 610-2 and 610-3 (e.g., which correspond to idle cores occupied by thread group (g) 720).

In one embodiment, rank mechanism 700 may determine rank 740-1 of thread group (g) 720 according to the following equation:

$$\text{Rank}_g = \Sigma_{m=1}^{M} \text{IC}[\text{CoreID}_m],$$

where $\text{Rank}_g$ may correspond to the rank of thread group (g), M may correspond to a total number of threads that belong to thread group (g), m may correspond to a core used by thread group (g), IC may correspond to a number of idle cores occupied by thread group (g), and $\text{CoreID}_m$ may correspond to an ID of the mth core used by thread group (g). Thus, a rank of thread group (g) may be equal to the number of idle cores occupied by the thread group.

If all threads of a thread group are active (e.g., being executed by one of cores 310), all corresponding bits 610 of the thread group may be reset and a rank of the thread group may be determined to be zero. If one or more threads of a thread group are idle (e.g., not being executed by one of cores 310, such as idle threads 470), one or more bits 610 of the thread group may be set (e.g., not reset) and a rank of the thread group may be determined to be greater than zero. For example, as shown in FIG. 7, since bit 610-3 is set (e.g., indicating that thread group (g) includes idle threads 470), rank mechanism 700 may determine rank 740-1 of thread group (g) to be a value greater than zero. Rank mechanism 700 may determine ranks 740-2 and 740-3 of other thread groups, and may output ranks 740-1, 740-2, and 740-3 (e.g., which may correspond to thread groups ranks 480). As further shown in FIG. 6, rank 740-2 may be zero, which may indicate that all threads of the corresponding thread group are active (e.g., being executed by one of cores 310).

Although FIG. 7 shows an example functional component of group ranker 420, in other embodiments, group ranker 420 may include different functional components, differently arranged functional components, or additional functional components than depicted in FIG. 7.

FIG. 8 is a diagram of example functional components of memory scheduler 430 of memory controller 320. In one embodiment, the functional components described in connection with FIG. 8 may be implemented by the one or more processors, microprocessors, ASICs, FPGAs, or other types of processing logic included in memory controller 320. As shown in FIG. 8, memory scheduler 430 may include a group rank rule component 800, a first-ready rule component 810, and a first-come first-serve rule component 820.

Group rank rule component 800 may include hardware or a combination of hardware and software that may receive memory requests 460 and thread groups ranks 480 (e.g., from group ranker 420), and may prioritize memory requests 460 based on thread groups ranks 480, as indicated by reference number 830. For example, group rank rule component 800 may prioritize a memory request from a thread group with a higher thread group rank over a memory request from a thread group with a lower thread group rank.

Group rank rule component 800 may ensure that a memory request (e.g., associated with idle thread groups and cores) is prioritized. Idle thread groups and cores may inform memory controller 320 of their idle state (e.g., via thread group ranks 480), which may indicate to memory controller 320 that the idle cores wish to share memory bandwidth with neighboring cores (e.g., other cores occupied by the same thread groups). Memory controller 320, in turn, may attempt to prioritize the neighboring cores. This may result in an overall system throughput increase via core idle time reduction. This may also decrease system power consumption by reducing static power and/or leakage power that may be consumed by idle cores.

First-ready rule component 810 may include hardware or a combination of hardware and software that may receive memory requests 460 and row buffer information 840 associated with memory requests 460. Row buffer information 840 may indicate which of memory requests 460 hits a row buffer (e.g., of main memory 230) or misses a row buffer. First-ready rule component 810 may prioritize memory requests 460 based on row buffer information 840, as indicated by reference number 850. For example, first-ready rule component 810 may prioritize a memory request that hits a row buffer over a memory request that misses a row buffer.

First-come first-serve component 820 may include hardware or a combination of hardware and software that may receive memory requests 460 and time information 860 associated with memory requests 460. Time information 860 may indicate times when memory requests 460 arrive (e.g., at main memory 230). First-come first-serve component 820 may prioritize memory requests 460 based on time information 860, as indicated by reference number 870. For example, first-come first-serve component 820 may prioritize a memory request that arrives earlier in time (e.g., at main memory 230) over a memory request that arrives later in time (e.g., at main memory 230).

As further shown in FIG. 8, group prioritized memory requests 830, row buffer prioritized memory requests 850, and/or time prioritized memory requests 870 may form prioritized memory requests 490. In one embodiment, memory scheduler 430 may schedule (e.g., prioritize) memory requests 460 using group rank rule component 800 first, first-ready rule component 810 second, and first-come first-serve rule component 820 third.

Although FIG. 8 shows example functional components of memory scheduler 430, in other embodiments, memory scheduler 430 may include fewer functional components, different functional components, differently arranged functional components, or additional functional components than depicted in FIG. 8. Alternatively, or additionally, one or more functional components of memory scheduler 430 may perform one or more other tasks described as being performed by one or more other functional components of memory scheduler 430.

Example Memory Controller Operations

FIGS. 9A and 9B are diagrams of example operations 900 capable of being performed by thread group receiver 400 (FIG. 4). As shown in FIG. 9A, a single-thread application 910 (e.g., APP_A) may include two memory requests 920-1 and 920-2 associated with core 310-1 of a multi-core processor (e.g., processing unit 220) and memory bank 330-1 (not shown). A multithread application (e.g., APP_B) may include two threads (e.g., APP_B1 thread 930 and APP_B2 thread 950) and a barrier for synchronization. Thread 930 may be associated with core 310-2 of processing unit 220 and memory bank 330-1 (not shown), may include two memory requests 940-6 and 940-7 provided after the barrier, and may include three memory requests 940-3, 940-4, and 940-5 provided before the barrier. Thread 950 may be associated with core 310-3 of processing unit 220 and memory bank 330-2 (not shown), and may include two memory requests 940-1 and 940-2 provided after the barrier.

Multithread application APP_B may be designed to take advantage of bank-level parallelism by having thread 930 access memory bank 330-1 and thread 950 access memory bank 330-2. Assume, for explanatory purposes, that thread 950 reaches the barrier ahead of thread 930 due to a possible load imbalance around the barrier (e.g., which may occur since it may be impossible to make a perfect runtime load balance). The load imbalance may prevent memory requests 940-1 and 940-2 associated with thread 950 from accessing memory bank 330-2, which may cause core 310-3 to be in an idle state. Core 310-3 may remain in the idle state until memory requests 940-3, 940-4, and 940-5, associated with thread 930, are handled. Thus, memory requests 940-3, 940-4, and 940-5 associated with thread 930 should be given priority over memory requests 920-1 and 920-2 associated with single-thread application 910 (e.g., so that core 310-3 remains idle for only three cycles as opposed to five cycles).

As shown in FIG. 9B, thread group receiver 400 (e.g., of memory controller 320) may receive threads 910, 930, and 950 (e.g., which may correspond to threads 440), thread information 510, and group ID information 520. For example, thread group receiver 400 may receive a group ID for thread 910 of single-thread application APP_A and may receive another group ID for threads 930 and 950 of multithread application APP_B. Thread group receiver 400 may generate thread group information 450-1 and 450-2 for threads 910, 930, and 950 based on thread information 510 and group ID information 520. For example, thread group receiver 400 may generate thread group information 450-1 (e.g., for thread 910 of single-thread application APP_A) and thread group information 450-2 (e.g., for threads 930 and 950 of multithread application APP_B).

Although FIGS. 9A and 9B show example operations capable of being performed by thread group receiver 400, in other embodiments, thread group receiver 400 may perform fewer operations, different operations, or additional operations than depicted in FIGS. 9A and 9B.

FIGS. 10A and 10B are diagrams of example operations 1000 capable of being performed by idle thread detector 410 (FIG. 6). As shown in FIG. 10A, thread 950 may reach the barrier ahead of thread 930 due to a possible load imbalance around the barrier. The load imbalance may prevent memory requests 940-1 and 940-2 associated with thread 950 from accessing memory bank 330-2 (not shown), which may cause core 310-3 to be in an idle state and may cause thread 950 to be idle, as indicated by reference number 1010.

As shown in FIG. 10B, inactive core bit vector 600 of idle thread detector 410 may include bit 610-1 (e.g., for core 310-1), bit 610-2 (e.g., for core 310-2), and bit 610-3 (e.g., for core 310-3). Bit 610-1 may be reset (e.g., to a value of zero) by inactive core bit vector 600 since bit 610-1 may be associated with memory requests 920-1 and 920-1 from a thread (e.g., thread 910) executing on a corresponding core (e.g., core 310-1). Bit 610-2 may be reset (e.g., to a value of zero) by inactive core bit vector 600 since bit 610-2 may be associated with memory requests 940-3, 940-4, and 940-5 from a thread (e.g., thread 930) executing on a corresponding core (e.g., core 310-2). Bit 610-3 may be set (e.g., to a value greater than zero) since bit 610-3 may not be associated with memory requests from a thread executing on a corresponding core (e.g., core 310-3). If bit 610-3 remains set at the end of time period 620, inactive core bit vector 600 may determine that a thread (e.g., thread 950) executing on the core (e.g., core 310-3) corresponding to bit 610-3 is idle during time period 620, as indicated by reference number 1020. Inactive bit core vector 600 may output indication 1020 of the idle thread.

Although FIGS. 10A and 10B show example operations capable of being performed by idle thread detector 410, in other embodiments, idle thread detector 410 may perform fewer operations, different operations, or additional operations than depicted in FIGS. 10A and 10B.

Figure 11:
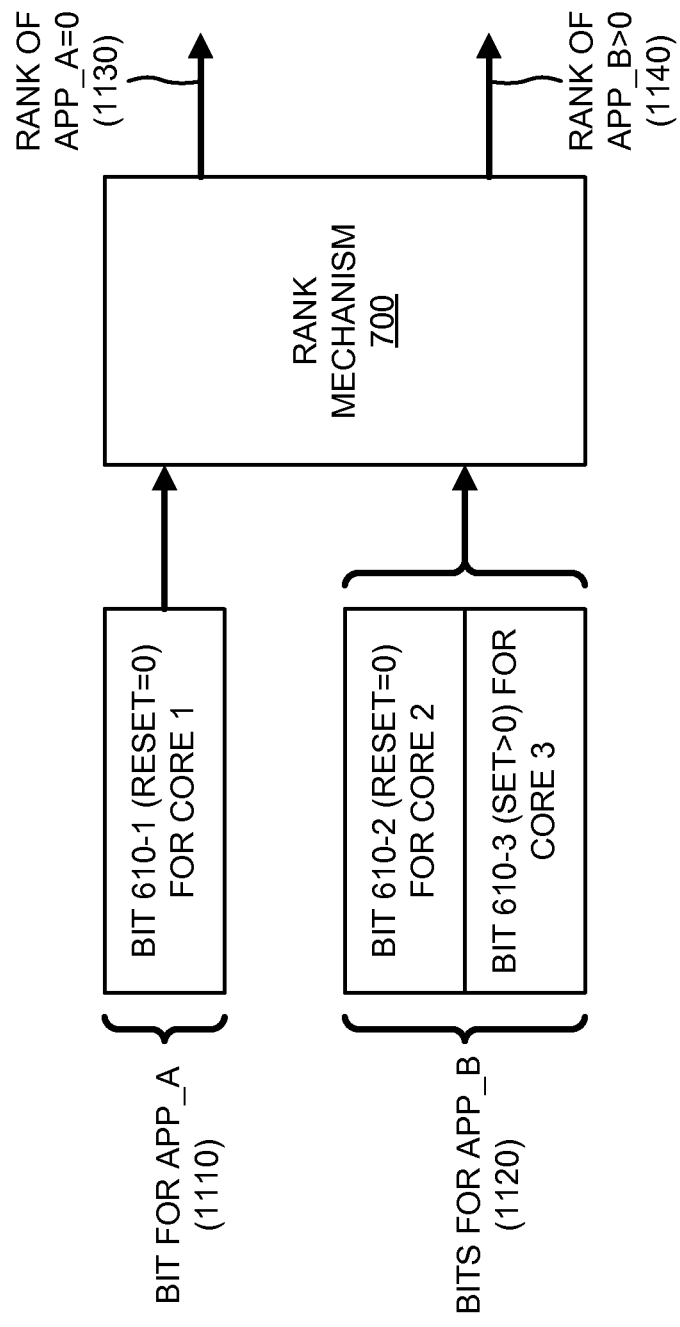
FIG. 11 is a diagram of example operations capable of being performed by the group ranker depicted in FIG. 7.

FIG. 11 is a diagram of example operations 1100 capable of being performed by group ranker 420 (FIG. 7). As shown, rank mechanism 700 of group ranker 420 may receive a bit 1110 for the single-thread application APP_A and bits 1120 for the multithread application APP_B. Bit 1110 may include bit 610-1, which may be reset (e.g., to a value of zero) as described above in connection with FIG. 10B. Bits 1120 may include bit 610-2, which may be reset (e.g., to a value of zero), and bit 610-3, which may be set (e.g., to a value greater than zero) as described above in connection with FIG. 10B.

Rank mechanism 700 may determine a rank 1130 of the single-thread application APP_A based on a value associated with bit 1110. As shown in FIG. 11, since bit 610-1 is set to a value of zero, rank 1130 of the single-thread application APP_A may be determined to be zero. Rank mechanism 700 may determine a rank 1140 of the multithread application APP_B based on bits 1120. In one embodiment, rank mechanism 700 may determine rank 1140 of the multithread application APP_B by adding values of bits 610-2 and 610-3. As shown in FIG. 11, since bit 610-2 is set to a value of zero and bit 610-3 is set to a value greater than zero, rank 1140 of the multithread application APP_B may be determined to be a value greater than zero.

Although FIG. 11 shows example operations capable of being performed by group ranker 420, in other embodiments, group ranker 420 may perform fewer operations, different operations, or additional operations than depicted in FIG. 11.

Figure 12:
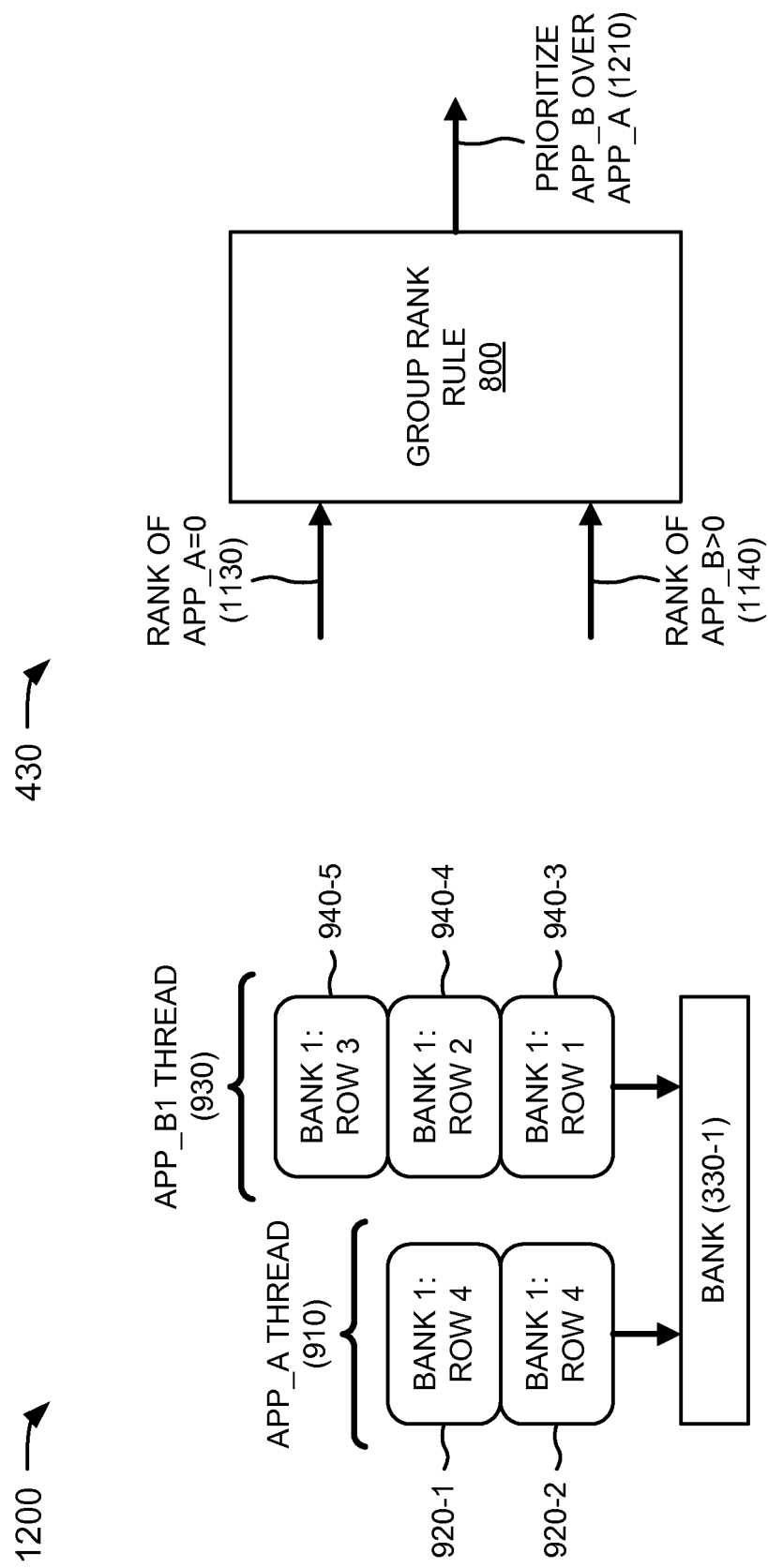
FIGS. 12A and 12B are diagrams of example operations capable of being performed by the memory scheduler depicted in FIG. 8.

FIGS. 12A and 12B are diagrams of example operations 1200 capable of being performed by memory scheduler 430 (FIG. 8). As shown in FIG. 12A, thread 910 (e.g., of the single-thread application APP_A) may include memory requests 920-1 and 920-2 that request memory from memory bank 330-1. Thread 930 (e.g., of the multithread application APP_B) may include memory requests 940-3, 940-4, and 940-5 that request memory from memory bank 330-1.

With reference to FIG. 12B, group rank rule component 800 of memory scheduler 430 may prioritize memory requests 940-3, 940-4, and 940-5 associated with thread 930 over memory requests 920-1 and 920-2 associated with thread 910 so that core 310-3 remains idle for only three cycles as opposed to five cycles. As shown in FIG. 12B, group rank rule component 800 may receive rank 1130 of the single-thread application APP_A and rank 1140 of the multithread application APP_B, and may prioritize the multithread application APP_B over the single-thread application APP_A based on ranks 1130 and 1140, as indicated by reference number 1210. For example, with reference to FIG. 12A, memory requests 940-3, 940-4, and 940-5 (e.g., of thread 930) may be designated rows 1, 2, and 3, respectively, of memory bank 330-1, whereas memory requests 920-1 and 920-2 (e.g., of thread 910) may be designated row 4 of memory bank 330-1. Since rows 1-3 of memory bank 330-1 come before row 4 of memory bank 330-1, memory requests 940-3, 940-4, and 940-5 may be acted upon before memory requests 920-1 and 920-2.

By prioritizing the multithread application APP_B over the single-thread application APP_A, memory controller 320 may reduce multithread application APP_B's idle time from five cycles (e.g., as would be the case with the FRFCFS and PAR-BS mechanisms) to three cycles. This may improve overall system throughput since core 310-3 may begin performing useful work earlier. This may also decrease system power consumption by reducing static power and/or leakage power that may be consumed by idle core 310-3.

Although FIGS. 12A and 12B show example operations capable of being performed by memory scheduler 430, in other embodiments, memory scheduler 430 may perform fewer operations, different operations, or additional operations than depicted in FIGS. 12A and 12B.

Figure 13:
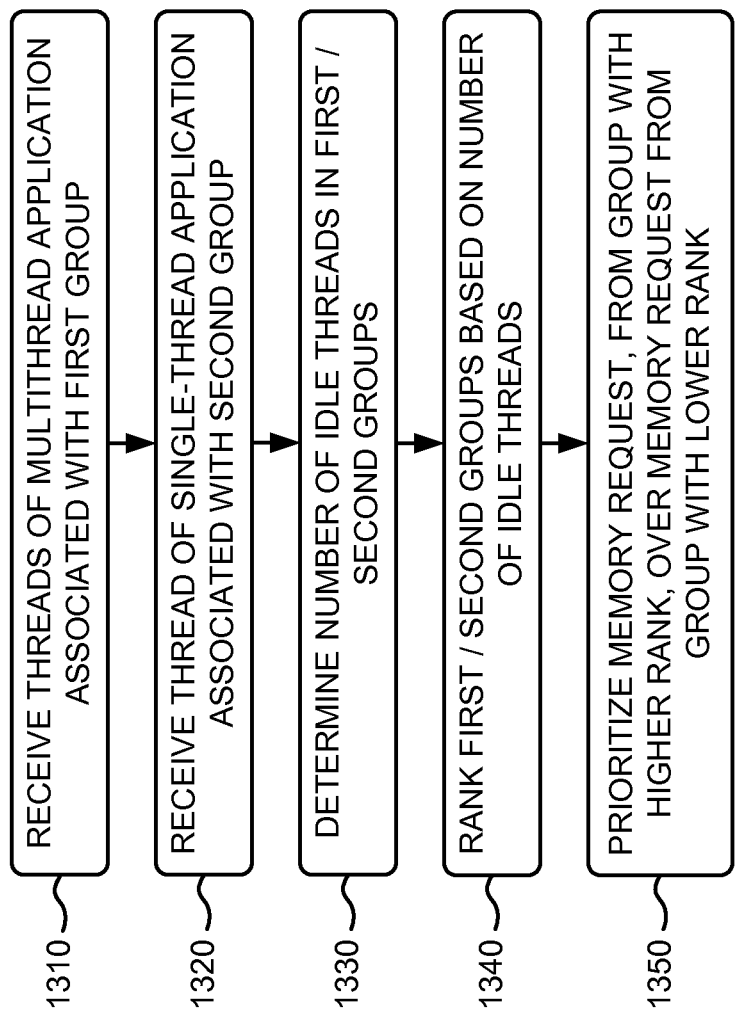
FIGS. 13-15 are flow charts of an example process for multithread application-aware memory scheduling according to embodiments described herein.
Figure 14:
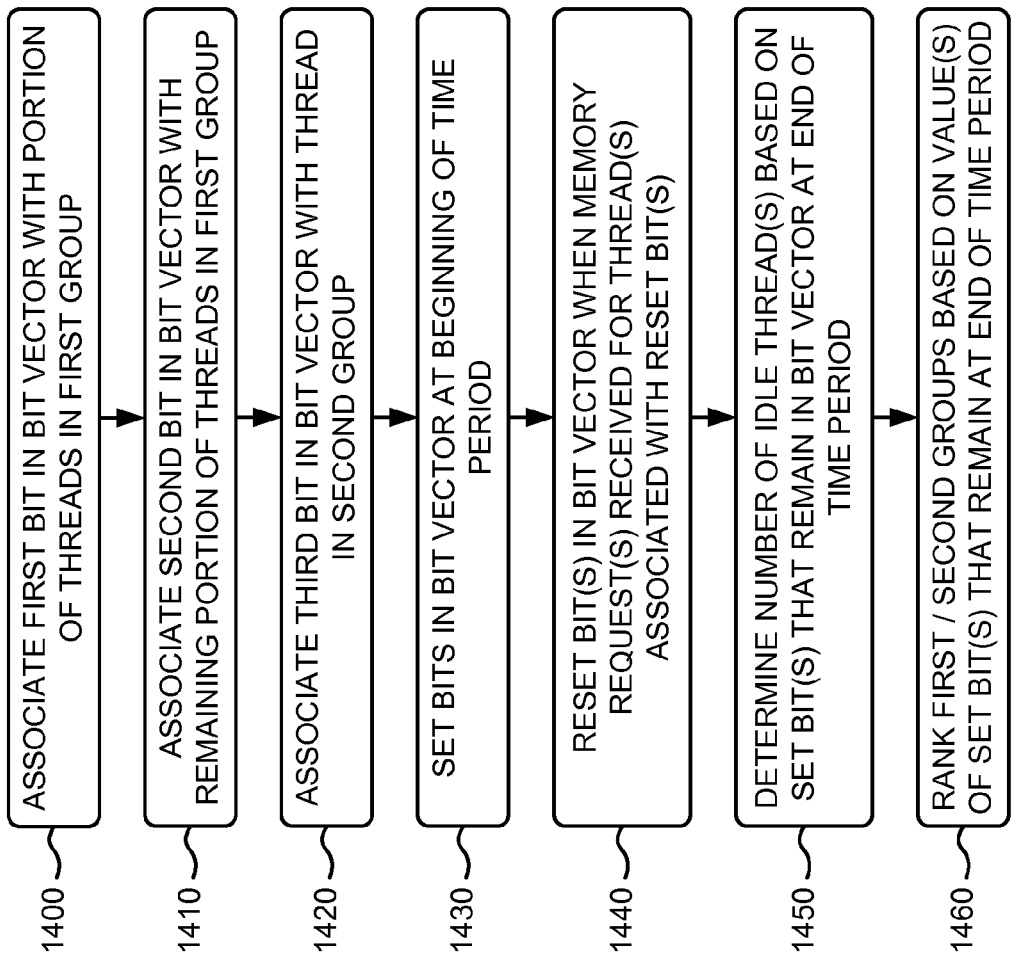
Figure 15:
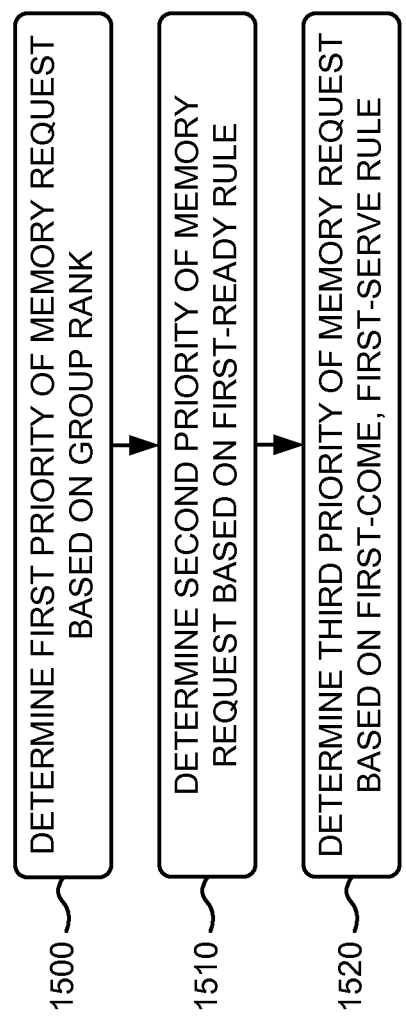

FIGS. 13-15 are flow charts of an example process 1300 for multithread application-aware memory scheduling according to embodiments described herein. In one embodiment, process 1300 may be performed by device 200 (FIG. 2). In another embodiment, some or all of process 1300 may be performed by one or more components of device 200, such as by memory controller 320.

As illustrated in FIG. 13, process 1300 may include receiving threads of a multithread application associated with a first group (block 1310), and receiving a thread of a single-thread application associated with a second group (block 1320). For example, in embodiments described above in connection with FIG. 4, thread group receiver 400 of memory controller 320 may receive one or more threads 440 associated with one or more applications, and may generate thread group information 450-1 (e.g., for a first thread group defined by an operating system of device 200) and thread group information 450-2 (e.g., for a second thread group defined by an operating system of device 200) for threads 440. In one example, thread group receiver 400 may generate thread group information 450-1 (e.g., as defined by the operating system) for a thread of a single-thread application and may generate thread group information 450-2 (e.g., as defined by the operating system) for threads of a multithread application.

As further shown in FIG. 13, process 1300 may include determining a number of idle threads in the first and second groups (block 1330). For example, in embodiments described above in connection with FIG. 4, idle thread detector 410 of memory controller 320 may receive thread group information 450-1 and 450-2 from thread group receiver 400, and may receive one or more memory requests 460 associated with threads 440. Idle thread detector 410 may determine which of threads 440 are idle based on thread group information 450-1/450-2 and memory requests 460, and may provide the determined idle threads to group ranker 420, as indicated by reference number 470.

Returning to FIG. 13, process 1300 may include ranking the first and second groups based on the determined number of idle threads (block 1340). For example, in embodiments described above in connection with FIG. 4, group ranker 420 of memory controller 320 may receive thread group information 450-1 and 450-2 from thread group receiver 400, and may receive idle threads 470 from idle thread detector 410. Group ranker 420 may rank threads in the thread groups (e.g., defined by thread group information 450-1 and 450-2) based on a number of idle threads 470 in each of the thread groups. Group ranker 420 may provide ranks of the thread groups to memory scheduler 430, as indicated by reference number 480.

As further shown in FIG. 13, process 1300 may include prioritizing a memory request, from a group with a higher rank, over a memory request from a group with a lower rank (block 1350). For example, in embodiments described above in connection with FIG. 4, memory scheduler 430 of memory controller 320 may receive thread groups ranks 480 from group ranker 420, and may receive one or more memory requests 460 associated with threads 440. Memory scheduler 430 may prioritize memory requests 460 based on thread groups ranks 480, as indicated by reference number 490, and may implement prioritized memory requests 490 in device 200.

Process blocks 1330 and 1340 may include the process blocks depicted in FIG. 14. As shown in FIG. 14, process blocks 1330 and 1340 may include associating a first bit in a bit vector with a portion of the threads in the first group (block 1400), associating a second bit in the bit vector with a remaining portion of the threads in the first group (block 1410), and associating a third bit in the bit vector with the thread in the second group (block 1420). For example, in embodiments described above in connection with FIG. 6, inactive core bit vector 600 of memory controller 320 may associate each of bits 610 with one of threads 440 and its corresponding core (e.g., one of cores 310) based on thread group information 450-1 and 450-2. In one example, inactive core bit vector 600 may associate bit 610-1 with a thread of a single-thread application, may associate bit 610-2 with a first thread of a multi-thread application, and may associate bit 610-3 with a second thread of the multithread application.

As further shown in FIG. 14, process blocks 1330 and 1340 may include setting the bits in the bit vector at the beginning of a time period (block 1430), and resetting one or more bits in the bit vector when one or more memory requests are received for thread(s) associated with the reset bit(s) (block 1440). For example, in embodiments described above in connection with FIG. 6, inactive core bit vector 600 may periodically set (e.g., to a particular value) each of bits 610 at a beginning of time period 620. Inactive core bit vector 600 may reset one of bits 610 when there is a memory request (e.g., memory request 460) from a thread (e.g., as defined by thread group information 450-1 and 450-2) executing on a corresponding core. In one example, bits 610-1, 610-2, and 610-4 may be associated with memory requests 460 from threads executing on a corresponding core. Thus, inactive core bit vector 600 may reset bits 610-1, 610-2, and 610-4. Since bit 610-3 is not associated with a memory request, inactive core bit vector 600 may not reset bit 610-3.

Returning to FIG. 14, process blocks 1330 and 1330 may include determining a number of idle thread(s) based on the set bit(s) that remain in the bit vector at the end of the time period (block 1450), and ranking the first and second groups based on value(s) of the set bit(s) that remain at the end of the time period (block 1460). For example, in embodiments described above in connection with FIGS. 6 and 7, if a bit (e.g., bit 610-3) remains set at the end of time period 620, inactive core bit vector 600 may determine that a thread executing on the core corresponding to bit 610-3 is idle during time period 620, as indicated by reference number 470. Inactive bit core vector 600 may output indication 470 of the idle thread. Group rank rule component 800 of memory controller 320 may receive memory requests 460 and thread groups ranks 480 (e.g., from group ranker 420), and may prioritize memory requests 460 based on thread groups ranks 480, as indicated by reference number 830. In one example, group rank rule component 800 may prioritize a memory request from a thread group with a higher thread group rank over a memory request from a thread group with a lower thread group rank.

Process block 1350 may include the process blocks depicted in FIG. 15. As shown in FIG. 15, process block 1350 may include determining a first priority of the memory request based on a group rank associated with the memory request (block 1500), determining a second priority of the memory request based on a first-ready rule (block 1510), and determining a third priority of the memory request based on the first-come, first-serve rule (block 1520). For example, in embodiments described above in connection with FIG. 8, memory scheduler 430 of memory controller 320 may schedule (e.g., prioritize) memory requests 460 using group rank rule component 800 first, first-ready rule component 810 second, and first-come first-serve rule component 820 third.

Systems and/or methods described herein may enable a memory controller of a device (e.g., a device with multi-core processors, such as a personal computer, a laptop computer, a tablet computer, a server device, and/or other types computation or communication devices) to recognize one or more multithread applications, and to adjust or optimize a memory scheduling scheme for the multithread application(s) based on the recognition of the multithread application(s). Such systems and/or methods may prevent performance degradation (e.g., in the device) due to inefficient memory scheduling.

The foregoing description of embodiments provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 13-15, the order of the blocks may be modified in other embodiments. Further, non-dependent blocks may be performed in parallel. In another example, the number of different applications and threads, described herein, were provided for explanatory purposes only.

It will be apparent that aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein. The software may also include hardware description language (HDL), Verilog, Register Transfer Level (RTL), Graphic Database System (GDS) II data or the other software used to describe circuits and arrangement thereof. Such software may be stored in a computer readable media and used to configure a manufacturing process to create physical circuits capable of operating in manners which embody aspects of the present invention.

Further, certain embodiments described herein may be implemented as "logic" that performs one or more functions.

This logic may include hardware, such as a processor, an ASIC, or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
   receiving, at the computing device, threads of a multithread application associated with a first group;
   receiving, at the computing device, a thread of a second application associated with a second group;
   identifying, by the computing device and based on receiving the threads of the multithread application, the multithread application; and
   adjusting, by the computing device, a memory scheduling scheme for the multithread application based on the identification of the multithread application.

2. The computing device-implemented method of claim 1, where adjusting a memory scheduling scheme comprises:
   determining a number of idle threads in the first group and the second group;
   ranking the first group based on the determined number of idle threads in the first group;
   ranking the second group based on the determined number of idle threads in the second group; and
   prioritizing a memory request, associated with one of the first group or the second group, whichever is ranked higher, over a memory request associated with one of the first group or the second group, whichever is ranked lower.

3. The computing device-implemented method of claim 2, where determining a number of idle threads comprises:
   associating a first bit in a bit vector with a first thread in the first group;
   associating a second bit in the bit vector with a second thread in the first group;
   associating a third bit in the bit vector with the thread in the second group;
   setting the first, second, and third bits in the bit vector at a beginning of a time period;
   resetting one or more of the first, second, or third bits in the bit vector when one or more memory requests are received for one or more threads associated with the reset one or more of the first, second, or third bits; and
   determining the number of idle threads in the first group and the second group based on the set bits that remain in the bit vector at an end of the time period.

4. The computing device-implemented method of claim 3, further comprising:
   ranking the first group and the second group based on the set bits that remain in the bit vector at the end of the time period.

5. The computing device-implemented method of claim 2, where prioritizing a memory request comprises:
   determining a first priority of the memory request based on a rank of a group associated with the memory request;
   determining a second priority of the memory request based on a first-ready rule; and
   determining a third priority of the memory request based on a first-come, first-serve rule.

6. A memory controller of a device, the memory controller comprising:
   processing logic, implemented at least partially in hardware, to:
      receive threads of a multithread application associated with a group,
      receive a thread of a single-thread application associated with another group,
      determine a number of idle threads in the group and the other group,
      rank the group based on the determined number of idle threads in the group,
      rank the other group based on the determined number of idle threads in the other group, and
      prioritize a memory request, associated with one of the group or the other group, whichever is ranked higher, over a memory request associated with one of the group or the other group, whichever is ranked lower.

7. The memory controller of claim 6, where, when determining a number of idle threads, the processing logic is further to:
   associate a first bit in a bit vector with a first thread in the group,
   associate a second bit in the bit vector with a second thread in the group,
   associate a third bit in the bit vector with the thread in the other group,
   set, to a value greater than zero, the first, second, and third bits in the bit vector at a beginning of a time period,
   reset, to a value of zero, one or more of the first, second, or third bits in the bit vector when one or more memory requests are received for one or more threads associated with the reset one or more of the first, second, or third bits, and
   determine the number of idle threads in the group and the other group based on the values of the set bits that remain in the bit vector at an end of the time period.

8. The memory controller of claim 7, where the processing logic is further to:
   rank the group and the other group based on the values of the set bits that remain in the bit vector at the end of the time period.

9. The memory controller of claim 6, where, when prioritizing a memory request, the processing logic is further to:
   determine a first priority of the memory request based on a rank of a group associated with the memory request,
   determine a second priority of the memory request based on a first-ready rule, and
   determine a third priority of the memory request based on a first-come, first-serve rule.

10. A device comprising:
    a memory controller comprising a per-core group identification register, the per-group identification register to:
       receive threads of a multithread application, the multithread application being associated with a first group, and
       receive a thread of a second application associated with a second group, the memory controller to:
       identify, based on receiving the threads of the multithread application, the multithread application, and
       adjust a memory scheduling scheme for the multithread application based on the identification of the multithread application.

11. The device of claim 10, where the memory controller further includes:
an idle thread detector to determine a number of idle threads in the first group and the second group.

12. The device of claim 11, where the idle thread detector is further to:
associate a first bit in a bit vector with a first thread in the first group,
associate a second bit in the bit vector with a second thread in the first group,
associate a third bit in the bit vector with the thread in the second group;
set, to a value greater than zero, the first, second, and third bits in the bit vector at a beginning of a time period,
reset, to a value of zero, one or more of the first, second, or third bits in the bit vector when one or more memory requests are received for one or more threads associated with the reset one or more of the first, second, or third bits, and
determine the number of idle threads in the first group and the second group based on the values of the set bits that remain in the bit vector at an end of the time period.

13. The device of claim 11, where the memory controller further includes:
a group ranker to rank a group (g) according to:

$$Rank_g = \Sigma_{m=1}^{M} IC[CoreID_m],$$

where $Rank_g$ corresponds to a rank of the group (g), M corresponds to a total number of threads that belong to the group (g), m corresponds to a core processor used by the group (g), IC corresponds to a number of idle core processors occupied by the group (g), and $CoreID_m$ corresponds to an identification of the mth core processor used by the group (g).

14. The device of claim 11, where the memory controller further includes:
a group ranker to:
rank the first group based on the determined number of idle threads in the first group, and
rank the second group based on the determined number of idle threads in the second group.

15. The device of claim 14, where the memory controller further includes:
a memory scheduler to prioritize a memory request, associated with one of the first group or the second group, whichever is ranked higher, over a memory request associated with one of the first group or the second group, whichever is ranked lower.

16. The device of claim 15, where the memory scheduler is further to:
determine a first priority of the memory request based on a rank of a group associated with the memory request,
determine a second priority of the memory request based on a first-ready rule, and
determine a third priority of the memory request based on a first-come, first-serve rule.

17. The device of claim 10, where the device includes a computation or communication device that utilizes multi-core processors and multithread applications.

18. A non-transitory computer-readable memory device that stores one or more computer-executable instructions executable by one or more processors, the computer-readable memory device comprising:
one or more instructions that, when executed by the one or more processors, cause the one or more processors to receive threads of a multithread application associated with a first group;
one or more instructions that, when executed by the one or more processors, cause the one or more processors to receive a thread of a second application associated with a second group;
one or more instructions that, when executed by the one or more processors, cause the one or more processors to identify, based on receiving the threads of the multithread application, the multithread application; and
one or more instructions that, when executed by the one or more processors, cause the one or more processors to adjust a memory scheduling scheme for the multithread application based on the identification of the multithread application.

19. The computer-readable memory device of claim 18, where the computer-readable memory device is provided in a memory controller of a processing unit.

20. The computer-readable memory device of claim 18, where the one or more instructions to cause the one or more processors to adjust a memory scheduling scheme include:
one or more instructions to cause the one or more processors to determine a number of idle threads in the first group and the second group,
one or more instructions to cause the one or more processors to rank the first group based on the determined number of idle threads in the first group,
one or more instructions to cause the one or more processors to rank the second group based on the determined number of idle threads in the second group, and
one or more instructions to cause the one or more processors to prioritize a memory request, associated with a higher ranked one of the first group or the second group, over a memory request associated with a lower ranked one of the first group or the second group.

21. The computer-readable memory device of claim 20, where the one or more instructions to cause the one or more processors to determine a number of idle threads include:
one or more instructions to cause the one or more processors to associate a first bit in a bit vector with a first thread in the first group,
one or more instructions to cause the one or more processors to associate a second bit in the bit vector with a second thread in the first group,
one or more instructions to cause the one or more processors to associate a third bit in the bit vector with the thread in the second group,
one or more instructions to cause the one or more processors to set, to a value greater than zero, the first, second, and third bits in the bit vector at a beginning of a time period,
one or more instructions to cause the one or more processors to reset, to a value of zero, one or more of the first, second, or third bits in the bit vector when one or more memory requests are received for one or more threads associated with the reset one or more of the first, second, or third bits, and
one or more instructions to cause the one or more processors to determine the number of idle threads in the first group and the second group based on the set bits that remain in the bit vector at an end of the time period.

22. The computer-readable memory device of claim 21, where the time period is substantially equal to about one-thousand clock cycles.

23. The computer-readable memory device of claim 21, further comprising:

one or more instructions to cause the one or more processors to rank the first group and the second group based on the set bits that remain in the bit vector at the end of the time period.

24. The computer-readable memory device of claim 20, where the one or more instructions cause the one or more processors to prioritize a memory request include:
one or more instructions to cause the one or more processors to determine a first priority of the memory request based on a rank of a group associated with the memory request,
one or more instructions to cause the one or more processors to determine, after determining the first priority, a second priority of the memory request based on a first-ready rule, and
one or more instructions to cause the one or more processors to determine, after determining the second priority, a third priority of the memory request based on a first-come, first-serve rule.

* * * * *